United States Patent

Paulat

(10) Patent No.: US 6,826,008 B2
(45) Date of Patent: Nov. 30, 2004

(54) DEVICE FOR TRANSFERRING A CARTRIDGE

(75) Inventor: Klaus Paulat, Schoenebuerg (DE)

(73) Assignee: Patentia Hergiswil AG, Hergiswil (CH)

( * ) Notice: Subject to any disclaimer, the term of this patent is extended or adjusted under 35 U.S.C. 154(b) by 151 days.

(21) Appl. No.: 10/005,359

(22) Filed: Nov. 8, 2001

(65) Prior Publication Data

US 2002/0085308 A1 Jul. 4, 2002

Related U.S. Application Data

(60) Provisional application No. 60/247,205, filed on Nov. 9, 2000, provisional application No. 60/247,204, filed on Nov. 9, 2000, and provisional application No. 60/247,153, filed on Nov. 9, 2000.

(30) Foreign Application Priority Data

Nov. 9, 2000 (DE) .......................................... 100 55 541

(51) Int. Cl.$^7$ .............................................. G11B 17/22
(52) U.S. Cl. ...................................... 360/92; 369/30.43
(58) Field of Search ..................... 360/92; 369/30.43; 414/751.1, 783; 294/93, 119.1

(56) References Cited

U.S. PATENT DOCUMENTS

| | | | | |
|---|---|---|---|---|
| 4,063,294 A | | 12/1977 | Burkhart | 360/92 |
| 4,802,035 A | * | 1/1989 | Ohtsuka | 360/92 |
| 4,853,916 A | * | 8/1989 | Tomita | 369/30.43 |
| 4,910,619 A | * | 3/1990 | Suzuki et al. | 360/92 |
| 4,945,430 A | * | 7/1990 | Konishi et al. | 360/92 |
| 5,036,503 A | * | 7/1991 | Tomita | 369/30.43 |
| 5,236,258 A | | 8/1993 | Bunch | 312/9.31 |
| 5,285,335 A | * | 2/1994 | Sato | 360/92 |
| 5,402,283 A | * | 3/1995 | Yamakawa et al. | 360/92 |
| 5,469,310 A | | 11/1995 | Slocum et al. | 360/92 |
| 5,588,796 A | | 12/1996 | Ricco et al. | 414/741 |
| 5,607,275 A | * | 3/1997 | Woodruff et al. | 414/331.05 |
| 5,682,276 A | * | 10/1997 | Hinnen et al. | 360/92 |
| 5,856,894 A | * | 1/1999 | Marlowe | 360/92 |
| 5,966,366 A | * | 10/1999 | Pollard | 369/30.43 |
| 6,141,178 A | * | 10/2000 | Nakajima et al. | 360/92 |
| 6,271,982 B1 | * | 8/2001 | Helmick | 360/92 |
| 6,385,003 B1 | * | 5/2002 | Ellis | 360/92 |
| 2002/0085458 A1 | * | 7/2002 | Luffel et al. | 369/30.43 |
| 2002/0118482 A1 | * | 8/2002 | Steinhilber | 360/69 |

FOREIGN PATENT DOCUMENTS

| | | | | |
|---|---|---|---|---|
| DE | 4017633 A1 | * | 12/1990 | G11B/15/68 |
| EP | 542482 A2 | * | 5/1993 | G11B/15/68 |
| EP | 1045382 A2 | | 10/2000 | |
| JP | 05225666 A | | 3/1993 | |
| JP | 05135462 A | * | 6/1993 | G11B/15/68 |
| JP | 06150495 A | * | 5/1994 | G11B/15/68 |
| JP | 06150496 A | * | 5/1994 | G11B/15/68 |
| JP | 06150498 A | * | 5/1994 | G11B/15/68 |
| JP | 10040616 A | * | 2/1998 | G11B/15/68 |

\* cited by examiner

*Primary Examiner*—William Klimowicz
(74) *Attorney, Agent, or Firm*—Baker Botts L.L.P.

(57) ABSTRACT

A system for transferring a cartridge includes at least two opposing bars, each bar adapted to slide in a longitudinal direction between an open position and a closed position; and at least two grippers, each gripper attached to an end of one of the bars and adapted to engage a cartridge when the bars are in the closed position. Each of the bars is further from a center point when in the open position than in the closed position. The bars and the grippers are adapted to move in a transverse direction in order to transfer the cartridge in the transverse direction.

4 Claims, 7 Drawing Sheets

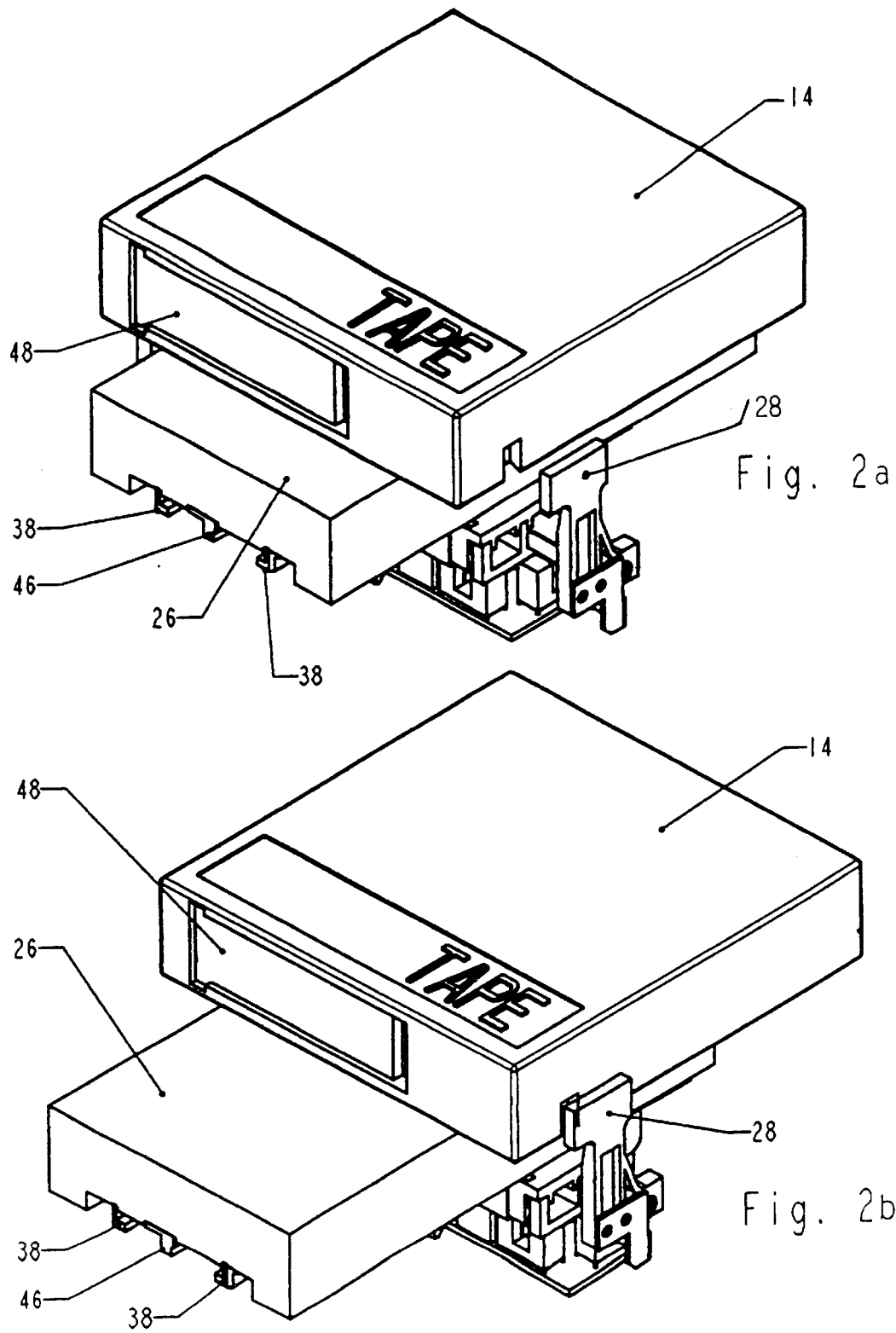

US 6,826,008 B2

DEVICE FOR TRANSFERRING A CARTRIDGE

RELATED APPLICATIONS

The following application are related to the present invention and are hereby incorporated by reference in their entirety:

1. U.S. patent application Ser. No. 09/709,852, titled "COMPACT COMBINATION CASSETTE LOADER AND TAPE DRIVE AND METHOD OF USING SAME," filed Nov. 9, 2000.
2. U.S. Provisional Patent Application Ser. No. 60/247,205, titled "BAR CODE SCANNER," filed Nov. 9, 2000
3. U.S. Provisional Patent Application Ser. No. 60/247,204, titled "AUTO LOADER DRIVE INTERFACE CONTROL," filed Nov. 9, 2000.
4. U.S. Provisional Patent Application Ser. No. 60/247,153, titled "AUTO LOADER COMBINATION," filed Nov. 9, 2000.
5. German Patent Application No. 100 55 626.4, titled "AUTOMATISCHE BIBLIOTHEK FÜR KASSETTEN VON DATENSPEICHERBÄNDERU," filed Nov. 9, 2000.
6. German Patent Application No. 100 55 625.6, titled "AUTOMATISCHE BIBLIOTHEK FÜR KASSETTEN," filed Nov. 9, 2000.
7. German Patent Application No. 100 55 624.8, titled "BIBLIOTHEK FÜR KASSETTEN EINES DATENSPEICHERBANDES," filed Nov. 9, 2000.
8. German Patent Application No. 100 55 541.1, titled "VORRICHTUNG ZUR ÜBERGABE EINER KASSETTE," filed Nov. 9, 2000.
9. U.S. patent application Ser. No. 10/005,693, Attorney, titled "AUTOMATIC LIBRARY FOR DATA STORAGE TAPE CAPTRIDGES," filed concurrently herewith.
10. U.S. patent application Ser. No. 10/005,966, Attorney Docket No. 056066-2025, titled "AUTOMATIC LIBRARY FOR DATA STORAGE TAPE CARTRIDGE," filed concurrently herewith.
11. U.S. patent application Ser. No. 10/005,343, Attorney Docket No. 056066-2026, titled "LIBRARY FOR DATA STORAGE TAPE CARTRIDGES," filed concurrently herewith.

BACKGROUND OF THE INVENTION

1. Field of the Invention

The invention relates to a device for transferring a cartridge. In particular, the invention relates to a device for transferring a cartridge for data storage tapes.

2. Related Art

Numerous application cases require transferring a cartridge, in particular a cartridge for data storage tapes from one receiver into another receiver. Such application cases are, for example, the exchange of a cartridge between a cartridge magazine and a tape cartridge drive. The known devices, on the one hand, are expensive and, on the other hand, are constructionally integrated into the particular receiver. Thus, the device is not universally applicable and cannot be adapted simply to different cases of use.

BRIEF DESCRIPTION OF THE DRAWINGS

In the following, the invention will be explained in further detail with reference to the drawings, in which:

FIG. 2a is an isolated representation of the guidance with a cartridge and the gripper system in the open position;

FIG. 2b is a representation corresponding to FIG. 2a with the gripper system in the closed position;

DESCRIPTION OF CERTAIN EMBODIMENTS OF THE INVENTION

One embodiment of the invention provides a device for transferring a cartridge, which with simple structure makes possible the versatile use and is simply adaptable to different cases of application.

Another embodiment of the invention comprises a system for transferring a cartridge comprising at least two opposing bars, each bar adapted to slide in a longitudinal direction between an open position and a closed position; and at least two grippers, each gripper attached to an end of one of the bars and adapted to engage a cartridge when the bars are in the closed position. Each of the bars is further from a center point when in the open position than in the closed position. The bars and the grippers are adapted to move in a transverse direction in order to transfer the cartridge in the transverse direction.

In another embodiment of the invention, a cartridge autoloader system comprises a drive for reading or writing data to a media cartridge, the drive having a cartridge pocket adapted to receive the media cartridge; a track substantially surrounding the drive; one or more carriers for carrying the media cartridges around the track, wherein the carriers are driven around the track by a drive system; and a gripper system for transferring the media cartridges between the drive and the carriers. The gripper system comprises at least two opposing bars, each bar adapted to slide in a longitudinal direction between an open position and a closed position, the longitudinal direction being substantially perpendicular to a radial direction of the track; and at least two grippers, each gripper attached to an end of one of the bars and adapted to engage a cartridge when the bars are in the closed position. Each of the bars is further from a center point when in the open position than in the closed position. The bars and the grippers are further adapted to move in a transverse direction in order to transfer the cartridge in the transverse direction, the transverse direction being substantially parallel to the radial direction of the track.

Figure 1:
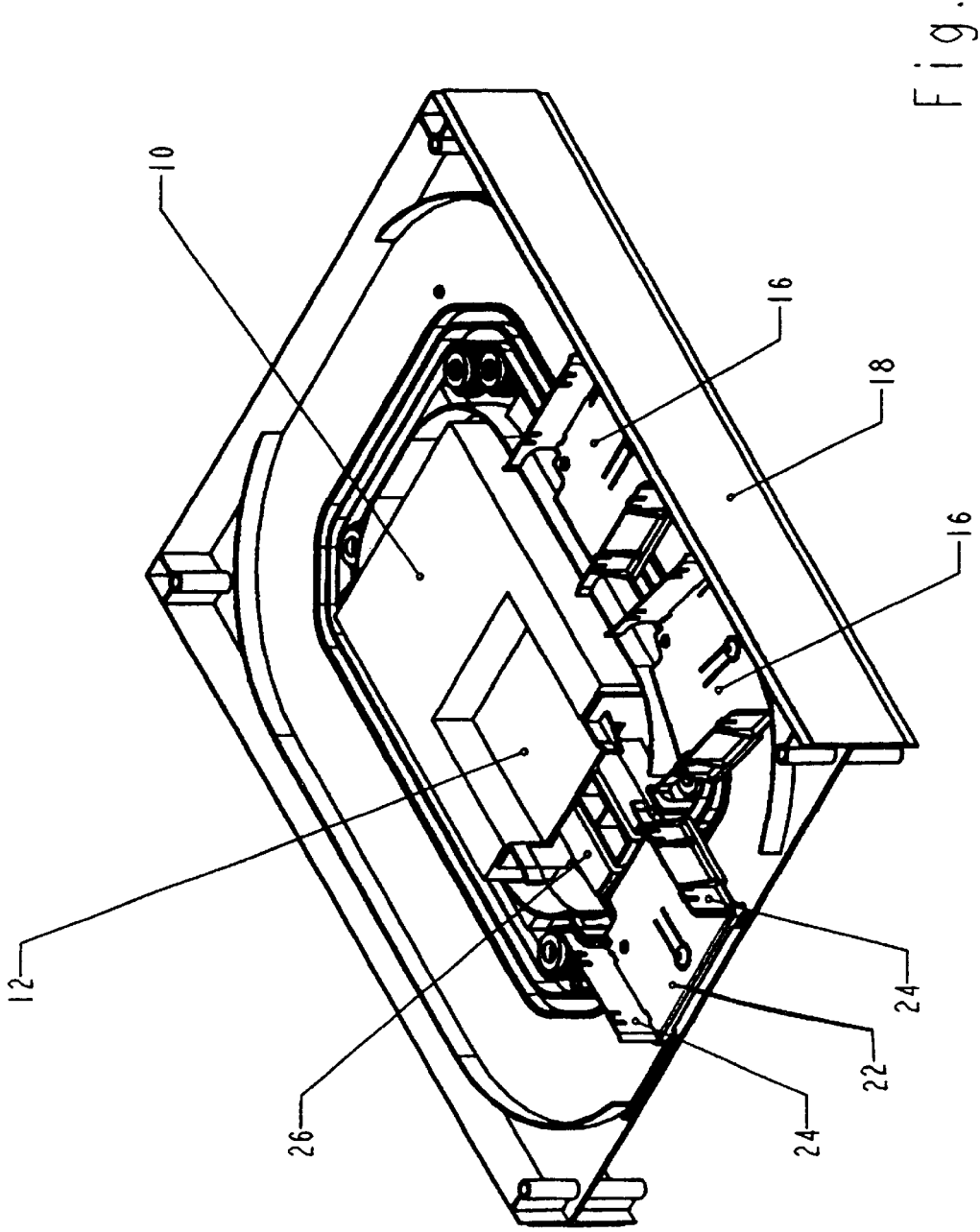
FIG. 1 is a perspective view of a cartridge magazine with a drive.

FIG. 1 shows a tape cartridge autoloader system, a so-called tape cartridge library. The library comprises a drive 10 for cartridges with a cartridge pocket 12. The drive 10 is disposed to lie flat. A multiplicity of cartridges 14 (shown in FIGS. 2a–b) can be contained in a magazine, which moves the cartridges 14 in a closed path of revolution about the drive 10. In this magazine the cartridges 14 are also disposed to lie flat in the same plane in which the drive 10 is located with its cartridge pocket 12. The cartridges 14 are disposed in the magazine in carriers 16, which are moved on the path of revolution by a drive, such as a belt drive, so as to be positionable at points on the path of revolution.

The cartridge pocket 12 of the drive 10 is directed toward the front side of a housing 18 of the library. In FIG. 1, the front panel of the housing 18 is not shown for the sake of clarity. A port 20 (shown in FIG. 4) in the front of the housing 18 is disposed for the introduction and removal of the cartridges 14 into and from the magazine.

Figure 4:
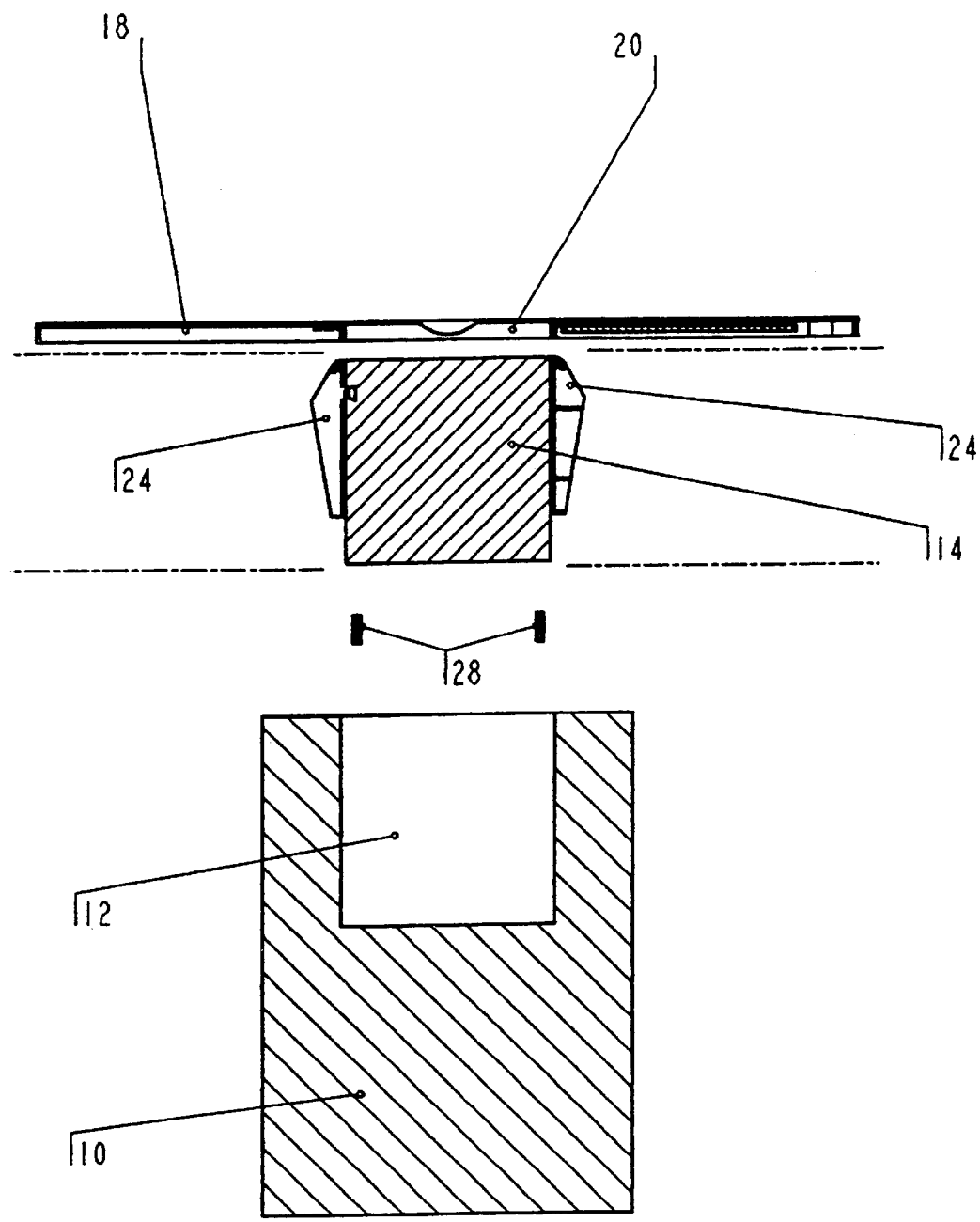
FIG. 4 is a schematic top view of a transfer device.

The carriers 16 can be positioned via the drive of the magazine in front of the drive 10 in such a way that the carriers 16 are aligned with the cartridge pocket 12, on the one hand, and with the port 20 in the front side of housing 18 on the other. This position is shown in FIG. 4.

The carriers 16 comprise a bottom 22 and two parallel lateral guidance walls 24. A cartridge 14 rests in contact with the bottom 22 of the carrier and is held and guided laterally by the guidance walls 24 such that in the direction of revolution of the magazine it assumes a definite position in the carrier 16 and is displaceable in the carrier 16 in the radial direction of the path of revolution. A latch (not shown) of the guidance walls 24, engaging the housing of the cartridge 14, secures the cartridge 14 in the carrier 16 against inadvertent displacement in the radial direction.

In front of the cartridge pocket 12 are disposed slide rails 26, extending in a slide-in direction of the cartridge pocket 12. The slide rails 26 bridge the interval between an entrance slot of the cartridge pocket 12 and the bottom 22 of the carrier 16 positioned in front of the cartridge pocket 12.

FIG. 1 illustrates an embodiment with two separated slide rails. However, other configurations of slide rails may be used as well. For example, FIGS. 2a–b illustrate an embodiment with one slide rail 26.

Figure 3A:
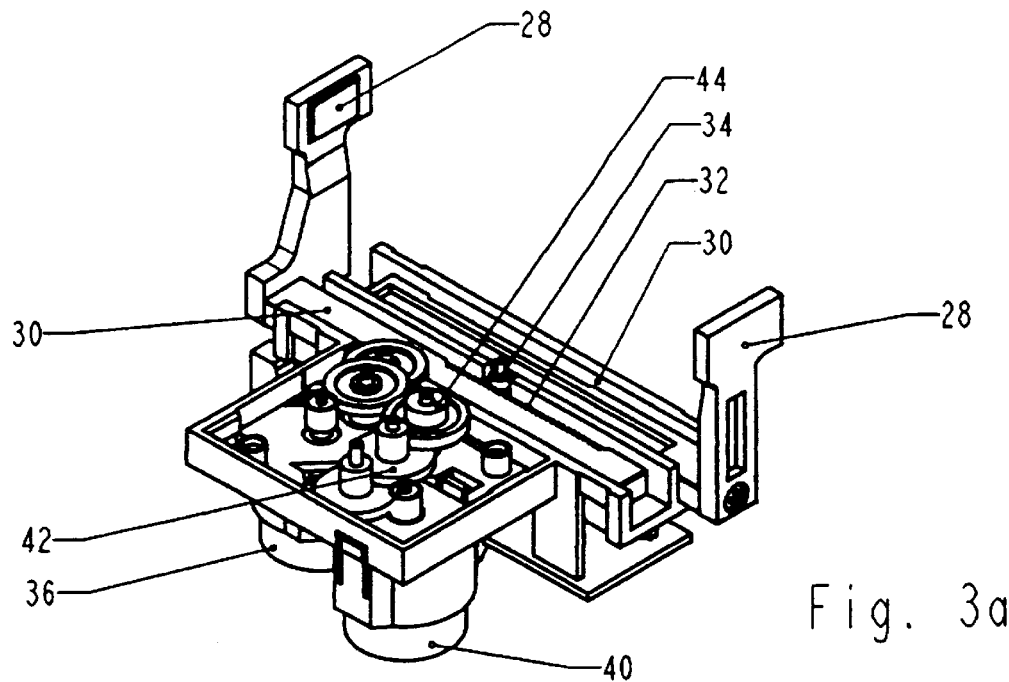
FIG. 3a illustrates the gripper system in the closed position.
Figure 3B:
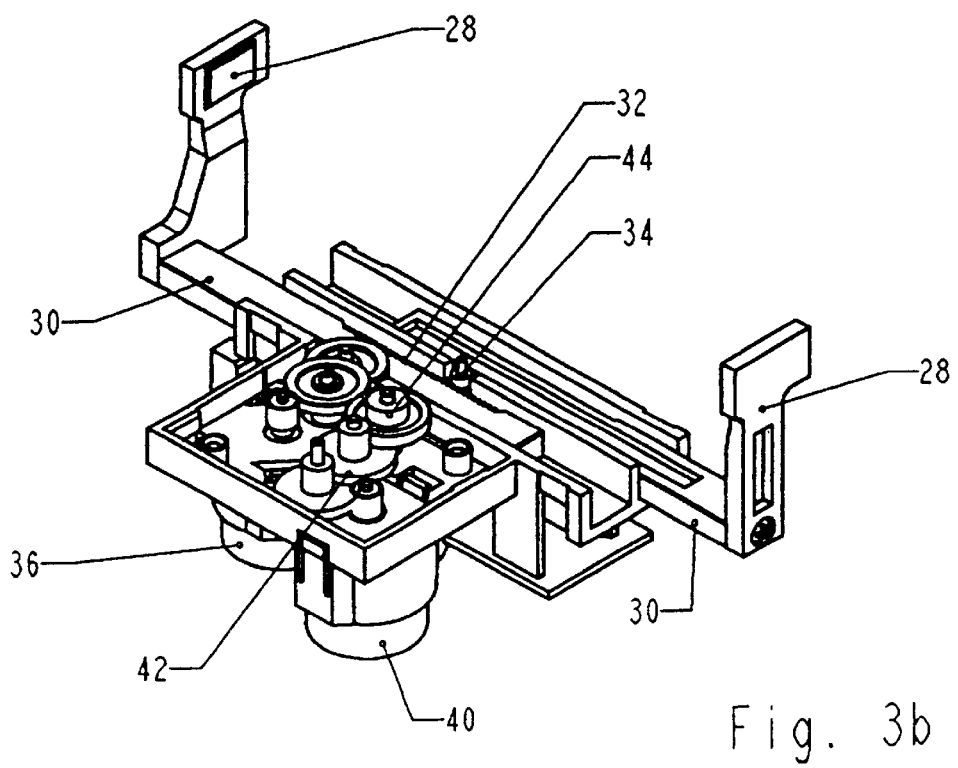
FIG. 3b illustrates the gripper system in the open position.

Beneath the slide rails 26 is disposed a gripper system which is depicted in FIGS. 3a and 3b. The gripper system comprises a gripper 28 on each side of the slide rails 26. The grippers 28 are adapted to reach upwardly in order to grasp the cartridges 14 and to transport them in the manner described below with reference to FIGS. 5a–l, 6a–n and 7a–c. The gripper system can remove a cartridge 14 from a carrier 16, positioned under control in front of the drive 10, and slide it into the cartridge pocket 12 of the drive. The gripper system can also pull a cartridge 14 from the cartridge pocket 12 of the drive 10 and deposit it into an empty carrier 16 of the magazine positioned in front of the cartridge pocket 12. Thereby, with the aid of the gripper system, a cartridge change between magazine and drive is feasible. The gripper system can also eject a cartridge 14 from the carrier 16 positioned in front of the cartridge pocket 12 through the port 20 to the outside. Conversely, through the port 20 the carrier 16 positioned between the port 20 and the drive 10 can also be loaded with a cartridge 14.

Herefrom results a broad versatility of the library with a constructionally simple structure. With the same gripper system the cartridge change between the magazine and the drive and the ejection of the cartridges from the magazine can be effected. Since the port 20, the carrier 16 and the cartridge pocket 12 are disposed radially aligned in this position, it is also possible to introduce a cartridge 14 through the port 20 and the empty carrier 16 directly into the drive 10 or to eject a cartridge 14 from the cartridge pocket 12 directly via the carrier 16 through the port 20. In this way the library with the magazine idle can also be used in the same way as a simple drive without a magazine.

The embodiment of the gripper system depicted in detail in FIGS. 3a and 3b comprises the two grippers 28 which reach upwardly on both sides adjacent to the slide rails 26. The grippers 28 are each attached on the end of sliding bars 30, which are displaceably guided beneath the slide rails 26 horizontally and transversely to the slide rails 26. The sliding bars 30 comprise toothings 32 facing one another, which are engaged by a common pinion gear 34. The pinion gear 34 may be driven under control by, for example, an electric motor 36 via a gearing. Depending on the direction of driving of the pinion gear 34, the sliding bars 30 are moved oppositely to one another in order to move the grippers 28 in a closing movement toward one another or in an opening movement away from one another.

The entire gripper system is movable in the longitudinal direction of the slide rails 26. For this purpose the gripper system is supported in guides 38 (shown in FIGS. 2a–b), which extend on the underside of the slide rails 26 in their longitudinal direction. The drive for the controlled movement of the gripper system along the slide rails 26 may be supplied by a further electric motor 40 of the gripper system, which, via a gearing 42, with a driving pinion 44 engages a toothed rack 46, which extends on the underside of the slide rails 26 in their longitudinal direction.

The operational function of the gripper system and the process flow of the transfer of the cartridges will be explained in the following in the schematic representation of FIG. 4 in conjunction with FIGS. 5a–l, 6a–n and 7a–c.

FIGS. 5a–l show the process flow involved in sliding a cartridge 14 into the cartridge pocket 12. The steps are illustrated sequentially in the figures.

Figure 5:
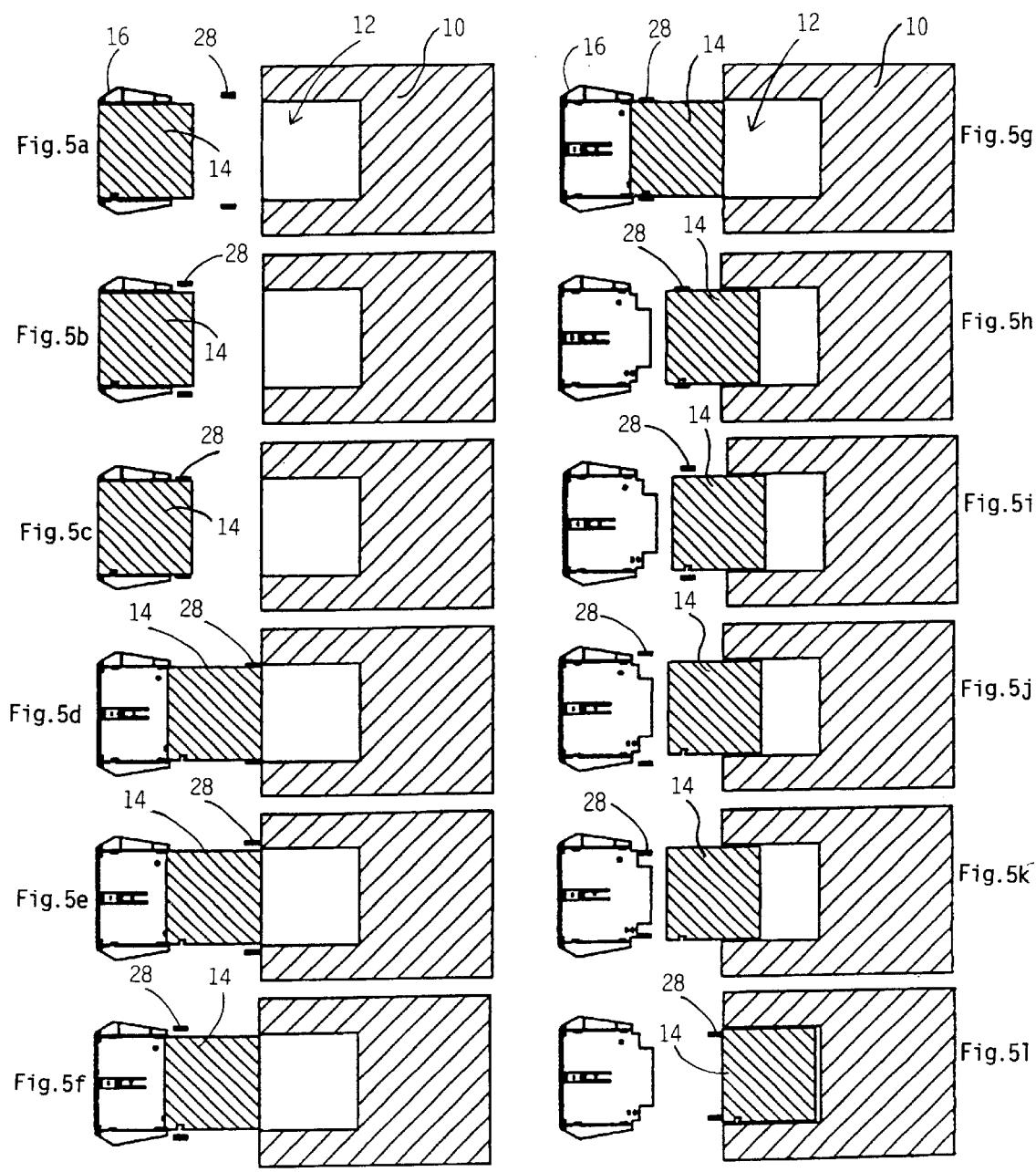
FIGS. 5a–l illustrate the process of loading the cartridge into a drive.

Referring first to FIG. 5a, the carrier 16 with the selected cartridge 14 is initially positioned under control in front of the cartridge pocket 12 by the drive of the magazine. The gripper system is in its starting position with opened grippers 28 between the drive 10 and the carrier 16. As shown in FIG. 5b, the gripper system subsequently moves the grippers 28 toward the carrier 16 with the grippers 28 remaining in the open position until the grippers 28 are located on both sides next to the cartridge 14. The grippers 28 are subsequently moved toward one another into the closed position such that they come laterally into contact with the cartridge 14 and clamp and retain it, as illustrated in FIG. 5c.

The gripper system now moves the grippers 28 closed toward the drive 10, until the grippers 28, with the front side of the cartridge 14, reach the cartridge pocket 12 (FIG. 5d). As illustrated in FIG. 5e, the grippers 28 are now again moved into the open position such that they release the cartridge 14, and the cartridge 14 comes to rest on the slide rails 26 (not shown in FIGS. 5a–l). The gripper system subsequently moves the open grippers 28 again toward the carrier 16 (FIG. 5f).

Now referring to FIG. 5g, once the grippers 28 reach the carrier 16 again, the grippers 28 are moved again into the closed position and grasp the cartridge 14 now near its rear end. The gripper system now again moves the closed grippers 28 toward the drive 10, whereby the cartridge 14 is slid into the cartridge pocket 12 (FIG. 5h). In this position, the cartridge may be located at a position in which the cartridge 14 is moved against a stop of the cartridge pocket 12 by which the flap 48 (shown in FIGS. 2a–b) of the cartridge 14 may be opened.

In FIG. 5i, the grippers 28 are now moved apart again and, in FIG. 5j, moved toward the carrier 16 beyond the rear edge of the cartridge 14. The grippers 28 are now moved again toward one another into the closed position (FIG. 5k). Since the grippers 28 are located behind the cartridge 14, they can be moved closer together to a mutual spacing which is less than the width of the cartridge 14. Subsequently, as illustrated in FIG. 5l, the grippers 28 may be again moved toward the drive 10 with the grippers 28 now engaging the backside of the cartridge 14 and sliding it completely into the cartridge pocket 12. During this last sliding of the cartridge 14 into the cartridge pocket 12, the cartridge 14 may be pressed against the stop of the cartridge pocket 12 which moves the cartridge flap 48 into its open position. Since the grippers 28 herein engage the rear edge of cartridge 14 and, in positive engagement, slide the cartridge 14, the resistance entailed in opening the flap 48 can be overcome by the grippers 28, which would be more difficult in the case of frictional engagement of the grippers 28 on the side edges of the cartridge 14.

Figure 6:
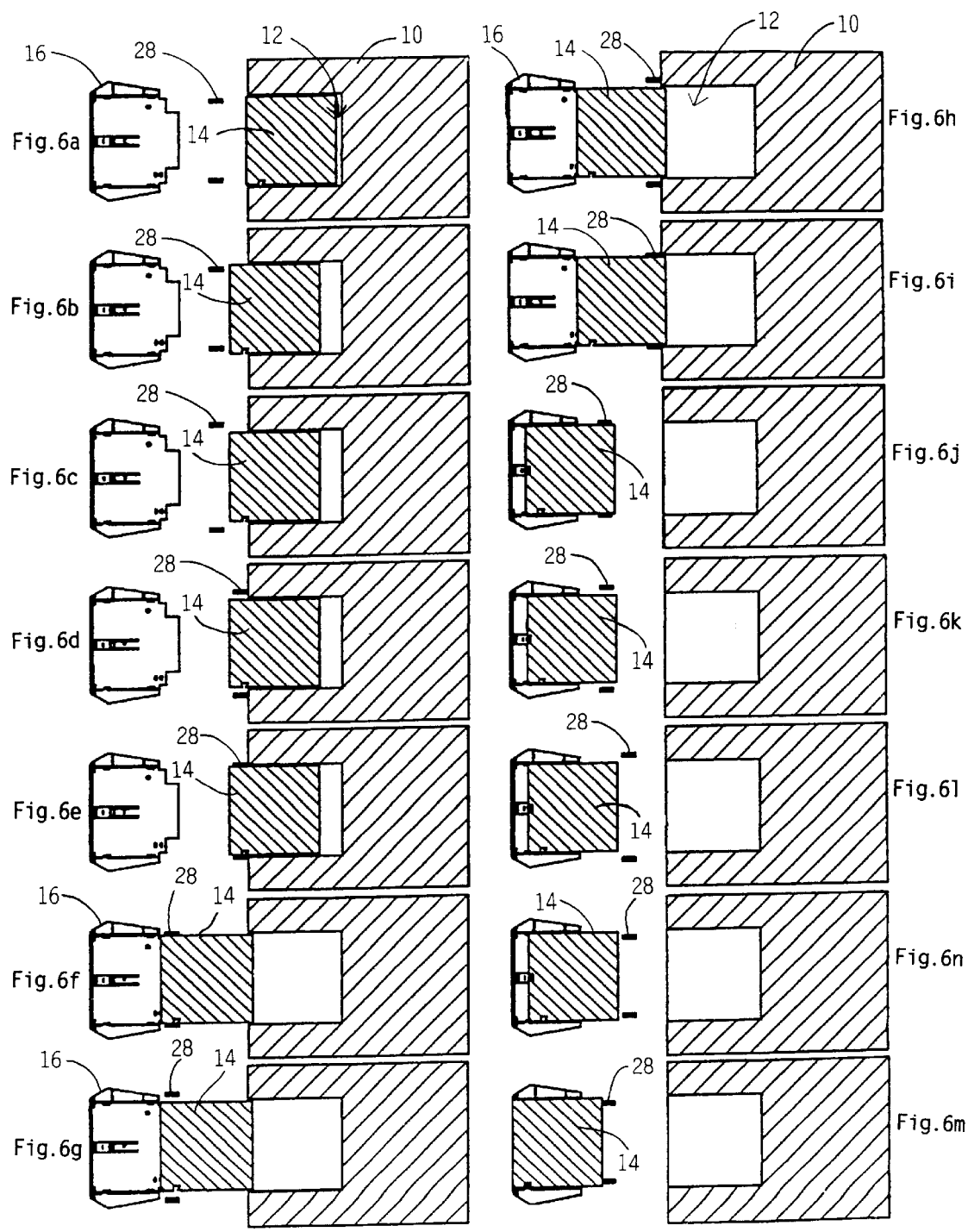
FIGS. 6a–n illustrate the process of removal of a cartridge from a drive.

In FIGS. 6a–n is shown correspondingly the manner in which the cartridge 14 is removed from the cartridge pocket 12 and transported in the carrier 16. As illustrated in FIG. 6a, the cartridge 14 is initially in the cartridge pocket 12 and the gripper system with the grippers 28 is in its starting position. The cartridge 14 is first ejected from the drive 10 by, for example, an internal drive mechanism (FIG. 6b). In FIG. 6c, the grippers 28 are moved apart, driven toward the drive 10 (FIG. 6d) and subsequently moved into their closed position in order to grasp the rear end of the cartridge 14 projecting from the cartridge pocket 12 of the drive 10 (FIG. 6e).

Subsequently, as illustrated in FIG. 6f, the gripper system moves the closed grippers 28 toward the carrier 16 in order to pull the cartridge 14 from the cartridge pocket 12. When the grippers 28 have reached the carrier 16, the grippers 28 are again moved apart in order to release the cartridge 14 (FIG. 6g), wherein the cartridge 14 again comes to rest on the slide rails 26 (not shown in FIGS. 6a–n). The grippers 28 are then again moved, for the purpose of regrasping the cartridge 14, toward the drive 10 (FIG. 6h) where they again grasp the cartridge, now at its front end (FIG. 6i).

The grippers 28 are then again moved toward the carrier 16 in order to slide the cartridge 14 into the carrier 16 (FIG. 6j). Once the cartridge 14 has arrived at the latching of the guidance wall 24 (see FIG. 4) of the carrier 16, the grippers 28 are opened again (FIG. 6k) and moved back beyond the front edge of cartridge 14 (FIG. 6l). The grippers 28 are then moved together in their closed position beyond the front edge of cartridge 14 (FIG. 6m) such that they can positively engage the front edge of cartridge 14 and, while overcoming the latching force, can press it completely into the latching of the carrier 16 (FIG. 6n).

Based on the process flow depicted in FIGS. 5a–l and 6a–n of the discrete steps, it is readily evident that the process flow can be modified if the cartridge 14 has greater or smaller dimensions in the direction of transport or if the transport path between the first receiver and the second receiver is larger or shorter with respect to the dimensions of the cartridge 14.

If the cartridge 14 has greater dimensions in the direction of transport or if the displacement path of the grippers 28 in the direction of transport is shorter than the dimension of the cartridge 14 in this direction, the regrasping of the grippers 28 according to the steps illustrated in FIG. 5e–i or according to the steps illustrated in FIGS. 6h–k can be repeated, such that the gripper system transports the cartridge in several steps over a path which is a multiple of the displacement path of the grippers 28.

If the dimensions of cartridge 14 in the direction of transport are smaller, the regrasping of the cartridge 14 by the grippers 28 can also be omitted. In this case the grippers 28 will already be moved during the first reverse movement behind the rear edge of cartridge 14 and moved together such that they engage positively this rear edge. In the process flow of FIGS. 5a–l, consequently, the steps illustrated in FIGS. 5f–i can be omitted and the step illustrated in FIG. 5j follows immediately after step illustrated in FIG. 5e. In the process flow of FIGS. 6a–n, the steps illustrated in FIGS. 6h–k can be omitted correspondingly and the step illustrated in FIG. 6l follows immediately after the step illustrated in FIG. 6g.

Figure 7:
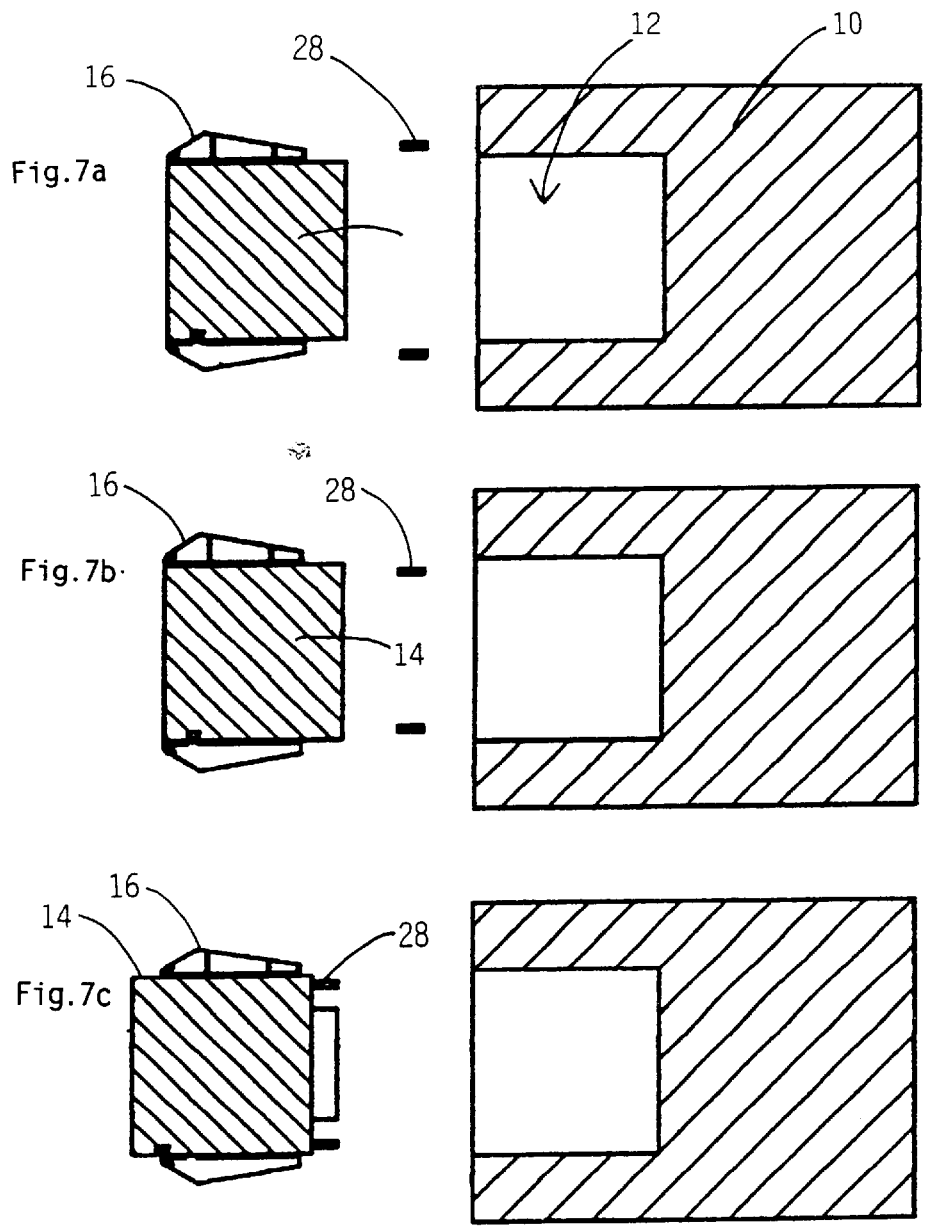
FIGS. 7a–c illustrate the process of ejection of a cartridge.

FIGS. 7a–c show a process by way of which the cartridge 14 is slid from the carrier 16 through port 20 in order to be removed from the magazine. Referring first to FIG. 7a, the cartridge 14 is initially in its latched position in the carrier 16. The grippers 28 in their starting position are between the carrier 16 and the drive 10 with the gripper 28 opened. As illustrated in FIG. 7b, the grippers 28 are moved into their closed position in which they have a lesser spacing than the width of the cartridge 14. Then, as illustrated in FIG. 7c, the gripper system now moves the grippers 28 toward the carrier 16 wherein the grippers 28 engage the front edge of cartridge 14 and slide it, while overcoming the latching, out of the carrier 16 through the port 20 (not shown in FIGS. 7a–c) such that the cartridge 14 can be grasped by the user and can be pulled out completely.

While particular embodiments of the present invention have been disclosed, it is to be understood that various different modifications and combinations are possible and are contemplated within the true spirit and scope of the appended claims. There is no intention, therefore, of limitations to the exact abstract or disclosure herein presented.

List of Reference Symbols

10 Drive
12 Cartridge pocket
14 Cartridges
16 Carriers
18 Housing
20 Port
22 Bottom
24 Guidance walls
26 Slide rails
28 Grippers
30 Sliding bars
32 Toothings
34 Pinion gear
36 Electric motor
38 Guidances
40 Electric motor
42 Gearing
44 Driving pinion
46 Toothed rack
48 Flap of cartridge

What is claimed is:

1. A system for transferring a cartridge within a transport plane, comprising:
at least two opposing bars arranged in a plane different from said transport plane, each bar adapted to slide in a longitudinal direction between an open position and a closed position;
at least two grippers, each gripper attached to an end of one of said bars thereby extending from said bars in such a way to engage a cartridge when said bars are in said closed position wherein the bars do not obstruct said transport plane, and
sliding rails arranged between said two grippers and between said cartridge and said bars when said grippers engage said cartridge;
wherein each of said bars is further from a center point when in said open position than in said closed position, and wherein said bars and said grippers are further adapted to move in a transverse direction in order to transfer said cartridge in said transverse direction.

2. The system according to claim 1, further comprising at least one pinion gear for engaging two of said bars, such that said bars and said grippers are opposingly movable between said open and closed positions.

3. The system according to claim 2, further comprising a motor for driving said pinion gear.

4. A cartridge autoloader system, comprising:

a drive for reading or writing data to a media cartridge, said drive having a cartridge pocket adapted to receive said media cartridge;

a track substantially surrounding said drive;

one or more carriers for carrying said media cartridges around said track, wherein said carriers are driven around said track by a drive system and wherein a carrier is aligned with said drive system to define a transport plane for said cartridge for exchange between said drive system and said carrier;

a gripper system for transferring said media cartridges between said drive and said carriers, said gripper system comprising:

at least two opposing bars arranged in a plane different from said transport plane, each bar adapted to slide in a longitudinal direction between an open position and a closed position, said longitudinal direction being substantially perpendicular to a radial direction of said track; and at least two grippers, each gripper attached to an end of one of said bars thereby extending from said bars in such a way to engage a cartridge when said bars are in said closed position wherein the bars do not obstruct said transport plane, and sliding rails arranged between said two grippers and between said cartridge and said bars when said grippers engage said cartridge;

wherein each of said bars is further from a center point when in said open position than in said closed position, and wherein said bars and said grippers are further adapted to move in a transverse direction in order to transfer said cartridge in said transverse direction, said transverse direction being substantially parallel to said radial direction of said track.

\* \* \* \* \*